(12) United States Patent
Williams et al.

(10) Patent No.: US 10,875,686 B2
(45) Date of Patent: Dec. 29, 2020

(54) FOOD TRAY COVER

(71) Applicants: Raymond K. Williams, Southfield, MI (US); CaCin Turner, Detroit, MI (US)

(72) Inventors: Raymond K. Williams, Southfield, MI (US); CaCin Turner, Detroit, MI (US)

(*) Notice: Subject to any disclaimer, the term of this patent is extended or adjusted under 35 U.S.C. 154(b) by 0 days.

(21) Appl. No.: 15/998,081

(22) Filed: Jun. 26, 2018

(65) Prior Publication Data
US 2019/0009954 A1 Jan. 10, 2019

Related U.S. Application Data

(60) Provisional application No. 62/524,654, filed on Jun. 26, 2017.

(51) Int. Cl.
B65D 43/02 (2006.01)
B65D 51/24 (2006.01)
B65D 45/20 (2006.01)
A47J 36/06 (2006.01)
A47J 36/30 (2006.01)
A47J 36/34 (2006.01)

(52) U.S. Cl.
CPC .......... B65D 43/0222 (2013.01); A47J 36/06 (2013.01); A47J 36/30 (2013.01); B65D 45/20 (2013.01); B65D 51/242 (2013.01); B65D 51/246 (2013.01); A47J 36/34 (2013.01)

(58) Field of Classification Search
CPC ...... B65D 43/22; B65D 43/24; B65D 51/242; B65D 51/246; B65D 2251/1016; B65D 2251/20; B65D 43/0222; B65D 45/20; A47J 36/06; A47J 36/30; A47J 36/34

USPC .......................................... 220/254.3, 254.5
See application file for complete search history.

(56) References Cited

U.S. PATENT DOCUMENTS

| 2,860,814 | A | * | 11/1958 | Duemler | B65D 43/0222 220/257.1 |
| 5,657,894 | A | * | 8/1997 | Bowen | B65D 43/169 220/254.3 |
| 6,206,221 | B1 | * | 3/2001 | Bando | B65D 47/0871 220/254.5 |
| D452,356 | S | * | 12/2001 | Zimmerman | D34/7 |
| 2005/0139598 | A1 | * | 6/2005 | Tack | B65D 43/163 220/259.1 |
| 2005/0247585 | A1 | * | 11/2005 | Breckwoldt | A45C 13/02 206/350 |
| 2006/0070995 | A1 | * | 4/2006 | Huang | B65F 1/1607 220/254.5 |
| 2008/0083768 | A1 | * | 4/2008 | Luburic | B65D 43/161 220/810 |

(Continued)

Primary Examiner — James N Smalley
(74) Attorney, Agent, or Firm — The Weintraub Group, P.L.C.

(57) ABSTRACT

A food tray cover comprising a frame, the frame dimensioned to seat atop a food tray, the frame including an upper surface having an outer edge, an inner edge, and a sidewall extending downwardly from the outer edge, the upper surface has an opening, the perimeter of the opening being defined by the inner edge of the upper surface; a lid rotatably attached to the frame over the opening formed therein, the lid being moveable between an open position and a closed position; means for biasing the lid between the closed position and the open position; and means for releasably locking the lid to the frame when in the closed position.

6 Claims, 12 Drawing Sheets

(56) References Cited

U.S. PATENT DOCUMENTS

| | | | |
|---|---|---|---|
| 2008/0156806 A1* | 7/2008 | Perry | B65D 25/2897 220/361 |
| 2009/0151226 A1* | 6/2009 | Apps | A01K 69/10 43/105 |
| 2011/0139781 A1* | 6/2011 | Jin | B65F 1/1607 220/254.5 |
| 2015/0259139 A1* | 9/2015 | Yang | B65F 1/1646 220/263 |

\* cited by examiner

US 10,875,686 B2

FOOD TRAY COVER

CROSS-REFERENCE TO RELATED APPLICATIONS

This application is a completion application of U.S. Provisional Patent Application Ser. No. 62/524,654, filed Jun. 26, 2017 for "FOOD TRAY COVER", the disclosure of which is hereby incorporated by reference in its entirety including the drawing.

BACKGROUND OF THE INVENTION

1. Field of the Invention

The present invention pertains to food trays. More specifically, the present invention concerns food tray covers. Even more particularly, the present invention pertains to lidded covers for food trays.

2. Description of Related Art

It is well known in the art to which the present invention pertains to use chafing dishes for serving food. Chafing dishes typically include a pan holding frame, a steam pan removably seated within the pan holding frame, and at least one food pan removably seated within the steam pan. The food pan may be either a low-cost, disposable pan or a reusable one.

A heating source such as a gel chafing fuel supply is placed below the steam pan in order to heat water within the steam pan which, in turn, heats the food within the food pan.

In order to preserve the heat within low-cost, disposable food pans, a removable lid having crimped edges is emplaced over the food pan. This requires a user to uncrimp the edges of the lid in order to remove it from the food pan to gain access to the content of the food pan. If necessary, the user must re-crimp the edges of the lid in order to re-secure it to the food pan to prevent the content therein to become contaminated and/or become cold. For these reasons, it is preferred that these types of food trays be covered when not in use.

In use, these types of chafing dishes are most commonly encountered in buffet style meals either in private or commercial settings. Ordinarily, people stand in a line to serve themselves food from individual food pans, as desired. This can become a cumbersome task for the user having to uncrimp the edges of the lid of the food pan, use a utensil to dole out a portion of the food, and, finally, re-crimp the edge of the lid back onto the food pan, all while balancing his or her own plate of food.

The prior art teaches a number of devices which attempt to solve this difficulty such as those disclosed in U.S. Pat. No. 9,220,375 to Haber, U.S. Pat. No. 5,033,162 to Jacob et al., U.S. Pat. No. 5,865,101 to Brown, and U.S. Pat. No. 2,442,869 to Dickman.

U.S. Pat. No. 9,220,375 to Haber teaches a chafing dish comprising a pan having a hinged, spring-loaded cover. A hinge assembly enables opening of the cover to any angle and counterbalancing of the cover to maintain the angle. However, the hinge assembly requires extensive, manual adjustments in order to open the cover to a user-selected angle. In order to test the counterbalance after adjusting, the cover is closed and if the cover moves up from the pan, the hinge assembly is too tight. Alternatively, if the cover closes too fast, the hinge assembly is too loose. Moreover, the chafing dish disclosed therein requires physically lifting or rotating the lid.

U.S. Pat. No. 5,033,162 to Jacob et al. teaches a cooking vat particularly useful in deep fryers. The vat includes a lockable cover and a hinge mechanism for opening the cover. To avoid the abrupt opening of the cover when the cover is unlocked, the hinge mechanism includes a braking device that causes the cover to open slowly. However, the hinge mechanism is a complex, delicately adjusted mechanism due to the mechanical components that need to withstand the high temperatures with deep fryers.

U.S. Pat. No. 5,865,101 to Brown teaches a cooking device comprising a cooking chamber and a lid pivotally mounted to the chamber. The chamber, itself, is mounted onto a plurality of legs. The lid is arranged to be raised from a closed position to an open position. A spring-operated piston facilitates raising and lowering the lid. Opposing ends of the piston interconnect the lid and at least one of the rear legs of the cooking device.

U.S. Pat. No. 2,442,869 to Dickman teaches a cover-operating mechanism for a cooking receptacle such as a roaster or the like. The receptacle includes a rotatable cover operably attached to the cover-operating mechanism. The cover-operating mechanism comprises a spring-loaded lever located below the receptacle and movable along a horizontal plane. Thus, the cover-operating mechanism may be operated from below the cover in order to raise the cover and avoid exposing the user's hand to hot steam expelled from the cover, once opened. However, the mechanism taught therein is not suitable for a chafing dish since such a lever would be closer to the heating source placed therebelow.

Therefore, it is to be appreciated that there is a need for a lidded cover for a food tray, which is not limited to being used with only a single food tray. Moreover, there is a need for such a cover, which overcomes the above shortcomings in order to facilitate easy lifting and lowering of a lid thereof.

It is to this to which the present invention is directed.

SUMMARY OF THE INVENTION

The present invention provides a food tray cover comprising:
(a) a frame, the frame dimensioned to seat atop a food tray, the frame including an upper surface having an outer edge, an inner edge, and a sidewall extending downwardly from the outer edge, the upper surface has an opening, the perimeter of the opening being defined by the inner edge of the upper surface;
(b) a lid rotatably attached to the frame over the opening formed therein, the lid being rotatable between an open position and a closed position;
(c) means for biasing the lid between the closed position and the open position; and
(d) means for releasably locking the lid to the frame when in the closed position.

With more particularity, the lid includes at least one arm extending through the frame in order to allow the lid to rotate with respect to the frame.

Preferably, the means for biasing the lid between the closed and open position comprises at least one torsionally prestressed spring or the like. The spring includes a first end, a winding, and a second end. The first end of the spring is retained in the frame and the second end is retained by the lid.

The spring is prestressed to a point such that when the lid is released from the frame, the spring unwinds to its unstressed point, thereby forcing the lid to open to an associated angle with respect to the frame.

In a first embodiment hereof the cover includes a sealing gasket being disposed about the inner edge and a utensil holder mounted atop the lid. Further, the lid includes at least one arm extending through the frame in order to allow the lid to rotate with respect to the frame.

In a second embodiment hereof the food tray cover includes a base or frame which removably seats about the upper edge of the food tray.

According to this embodiment means for limiting the degree of rotation of the lid when in the open position includes a stop integrally formed with the frame.

It is to be understood that the specific angle the lid is opened to is directly related to the degree of stress imparted to the spring when the lid is in the closed position.

The cover further includes cutout sections for facilitating grasping of the food tray, itself through its ordinarily provided handles. Steam vents are formed in the frame or base.

For a better understanding of the present invention, reference is made to the accompanying drawing and detailed description. In the drawing, like reference numerals refer to like parts through the several views, in which:

DETAILED DESCRIPTION OF THE INVENTION

Figure 1:
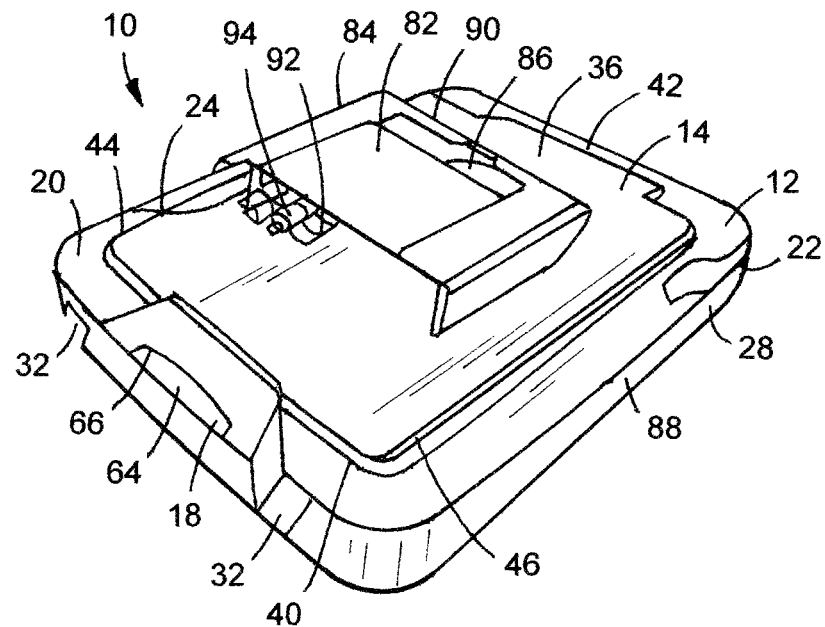
FIG. 1 is a perspective view of a food tray cover in accordance with the present invention in a closed position.
Figure 1:
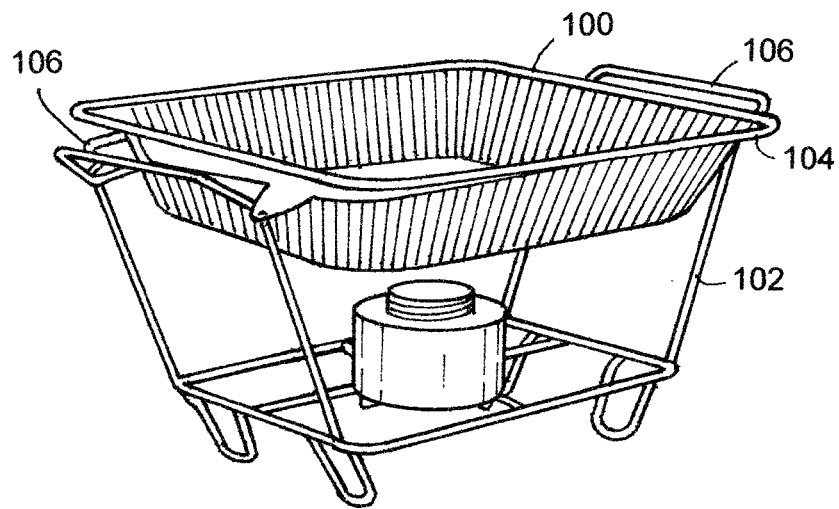

Referring now to the drawing, and in a first embodiment hereof, the present invention provides a food tray cover, generally, comprising:

(a) a frame, the frame dimensioned to seat atop a food tray, the frame including an upper surface having an outer edge, an inner edge, and a sidewall extending downwardly from the outer edge, the upper surface has an opening, the perimeter of the opening being defined by the inner edge of the upper surface, the frame further includes a sealing gasket being disposed about the inner edge;
(b) a lid rotatably attached to the frame over the opening formed therein, the lid being moveable between an open position and a closed position;
(c) a utensil holder mounted atop the lid;
(d) means for biasing the lid between the closed position and the open position; and
(e) means for releasably locking the lid to the frame when in the closed position.

Figure 3:
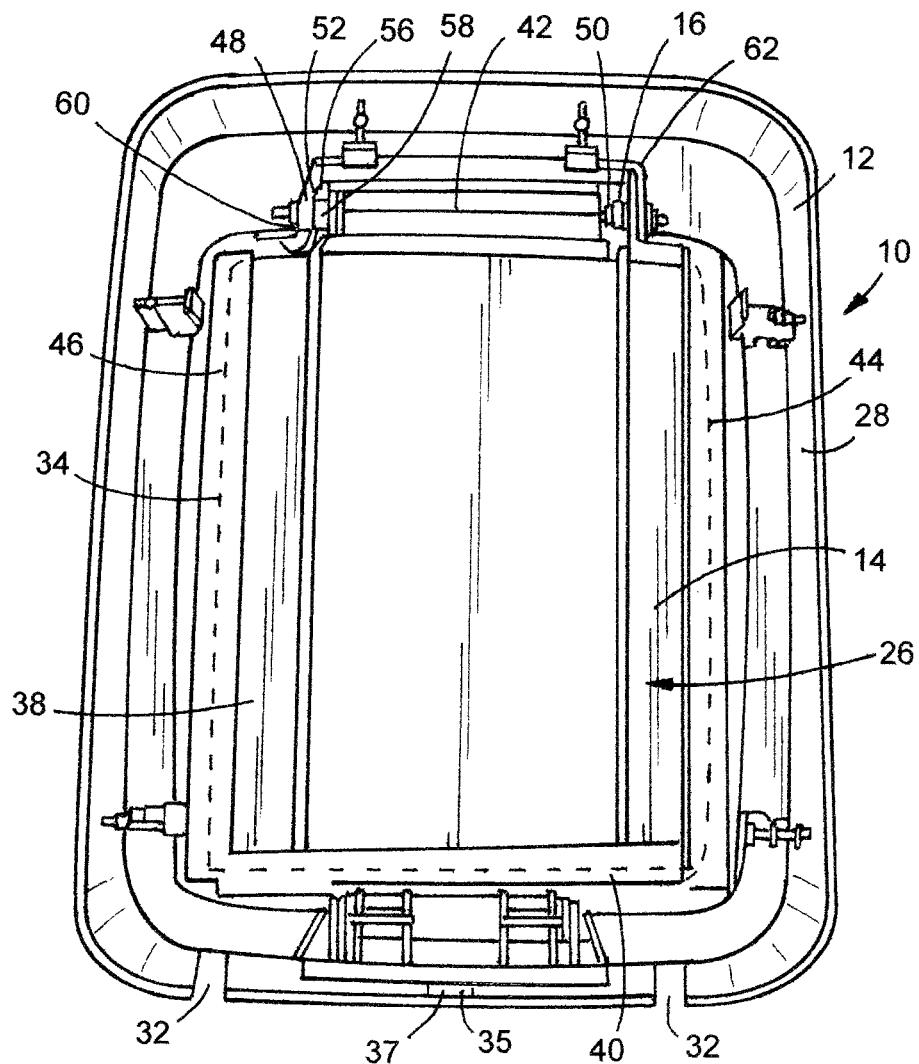
FIG. 3 is a bottom view of the food tray cover hereof.

With more particularity and with reference to FIGS. 1 and 3 of the drawing, there is depicted a food tray cover denoted at 10. It is to be appreciated that the food tray cover 10 is dimensioned to seat atop an existing open-top food tray 100. The food tray may be a stand alone food container or a tray used in combination with a chafing dish set which includes a wire frame 102. Thus, the food tray 100 includes a perimetral lip 104 for removably seating the food tray 100 on or within the wire frame 102 with handles 106 associated with the food tray.

As shown, the cover 10, generally, comprises: (a) a frame 12; (b) a lid 14 rotatably attached to the frame 12; (c) a utensil holder 82 mounted atop the lid 14 (d) means 16 for biasing the lid 14 between an open and closed position; and (e) means 18 for releasably locking the lid 14 in a closed position.

The frame 12 includes an upper surface 20 having an outer edge 22 and an inner edge 24. An opening 26 is formed in the upper surface 20, the perimeter of the opening 26 being defined by the inner edge 24. The frame 12 further includes a sidewall 28 extending downwardly from the outer edge 22. As shown, the sidewall 28 envelops a portion of the tray food tray 100 in order to cover the top thereof.

Optionally, the frame 12 may include a plurality of cutouts 32 formed in the sidewall 28 of the frame 12. As is known to the skilled artisan, typical wire frames, such as that shown at 102, include the handles 106 for carrying purposes. Thus, the cutouts 32 provide space for the ends of the handles 106 to nest within such or project outwardly therethrough that the cover 12 can still be lowered onto the tray 100 without being obstructed by the handles 106 while permitting easy transport. It is to be appreciated that the cutouts 32 do not allow heat to escape since the cutouts 32 allow the upper surface 20 of the frame 12 to sit flush atop the tray 100.

Preferably, the cover 12 is formed from any suitable material such as aluminum, non-toxic plastic, or any other suitable, low heat conducting material. While standard, low-cost food trays are disposable after one-time use, preferably, the cover 10 hereof is to be re-used with multiple food trays 100.

Optionally, the frame 12 may include a plurality of cutouts 32 formed in the sidewall 28 of the frame 12. As is known to the skilled artisan, typical wire frames, such as that shown at 102, include the handles 106 for carrying purposes. Thus, the cutouts 32 provide space for the ends of the handles 106 to nest within such or project outwardly therethrough that the cover 10 can still be lowered onto the tray 100 without being obstructed by the handles 106 while permitting easy transport. It is to be appreciated that the cutouts 32 do not allow heat to escape since the cutouts 32 allow the upper surface 20 of the frame 12 to sit flush atop the tray 100.

Preferably, the cover 10 is formed from any suitable material such as aluminum, non-toxic plastic, or any other suitable, low heat conducting material. While standard, low-cost food trays are disposable after one-time use, preferably, the cover 10 hereof is to be re-used with multiple food trays 100.

Preferably, the frame 12 further comprises a sealing gasket 34 disposed about the inner edge of the frame 12. Thus, when the lid 14 is in the closed position, the gasket 34 acts as a barrier to prevent heat from escaping out of the food tray 100 through any openings between the frame 12 and the lid 14. The gasket 54 is secured to the frame 12 using any suitable, non-toxic adhesive that can withstand high temperatures without melting or losing its adhesive strength. The sealing gasket 34 may be formed from any suitable material for blocking heat such as rubber or the like.

The frame 12, preferably, comprises means 35 for temporarily securing the cover 10 to a food tray. The means 35 or securing means 35 is an inwardly facing rotatable hook 37 disposed on the sidewall 28 of the frame 12 for engaging the tray 100 (FIG. 1). Thus, as the cover 10 is lowered onto the tray 100, the hook 37 engages the lip 104 and is removably secured thereto. This prevents the cover 10 from being blown off the tray 100 by wind when being used outdoors and the lid 14 is opened or otherwise unintentionally removed. Preferably, the frame 12 is slightly deformable or flexible such that the hook 37 may be disengaged from the tray by pulling the frame 12, and thus the hook 37, away from the lip of the tray 100. Although only a single hook 37 is shown, it is to be understood that any number of hooks 37 may be employed and disposed around the frame 12 for engaging the tray 100.

With regard to the lid 14, the lid 14 has a top surface 36 and a bottom surface 38. The lid 14 may be planar or, alternatively, convex. When the lid 14 is convex, condensation formed on the bottom surface 38 of the lid 14 is drawn to the perimeter thereof in order to prevent the condensation from dripping back onto the food and causing it to become soggy. The lid 14 further includes a forward edge 40, a rear edge 42, and a pair of opposing side edges 44, 46.

Figure 2:
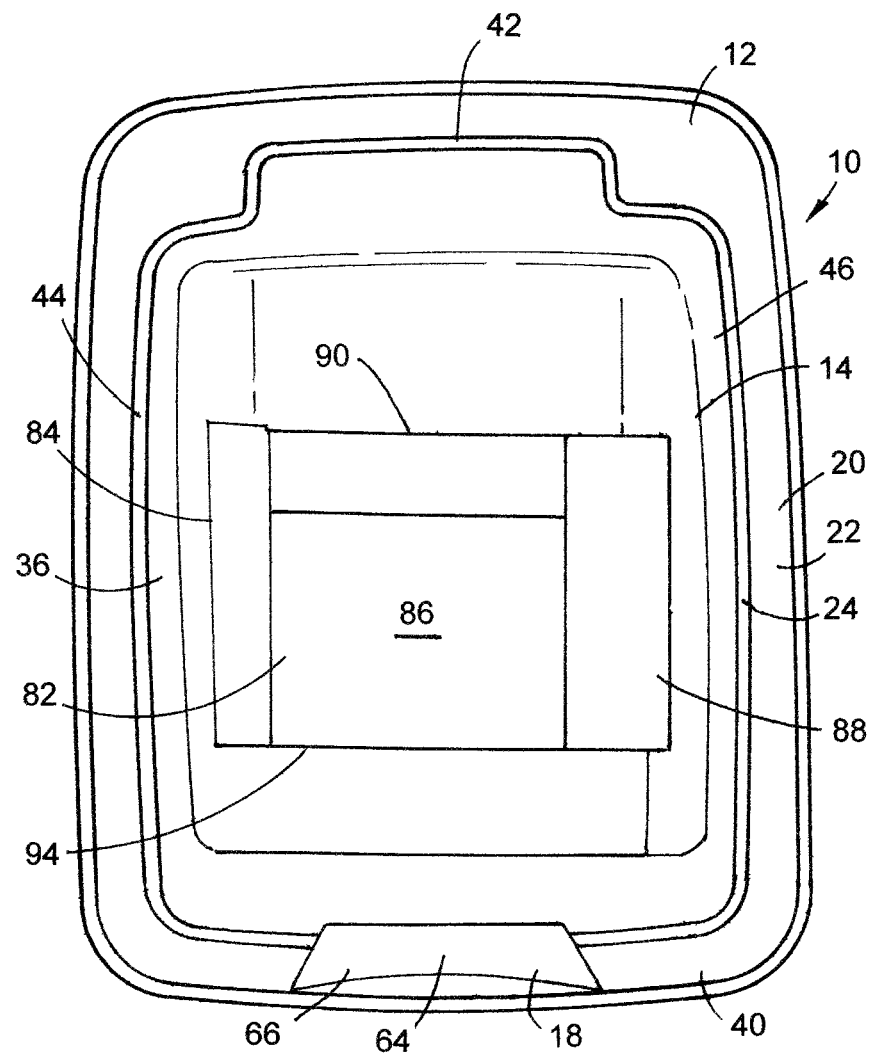
FIG. 2 is a top view of the food tray cover hereof.

As shown in FIGS. 1 and 2, the lid 14 further comprises a utensil holder 82 disposed on the top surface 36 of the lid 14. The holder 82 comprises a plurality of walls 84, 86, 88, 90 which cooperate to define an interior 92 thereof having an open side 94. Thus, a utensil such as a spatula, tongs, or the like may be removably disposed within the interior 92 of the holder 82 for temporary storage. This allows the utensil to stay clean while not in use and avoid contamination thereto if the utensil is set down on a dirty table surface or otherwise misplaced.

Figure 4:
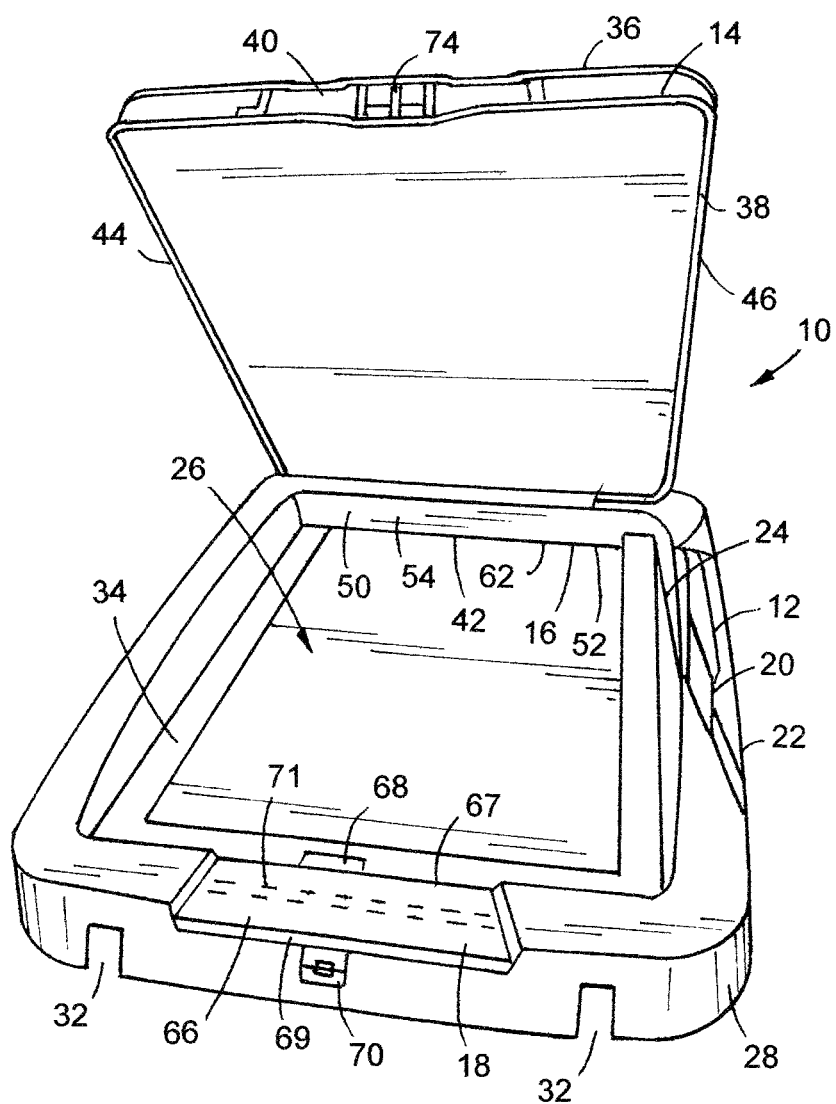
FIG. 4 is a perspective view of the food tray cover hereof in an open position.
Figure 5:
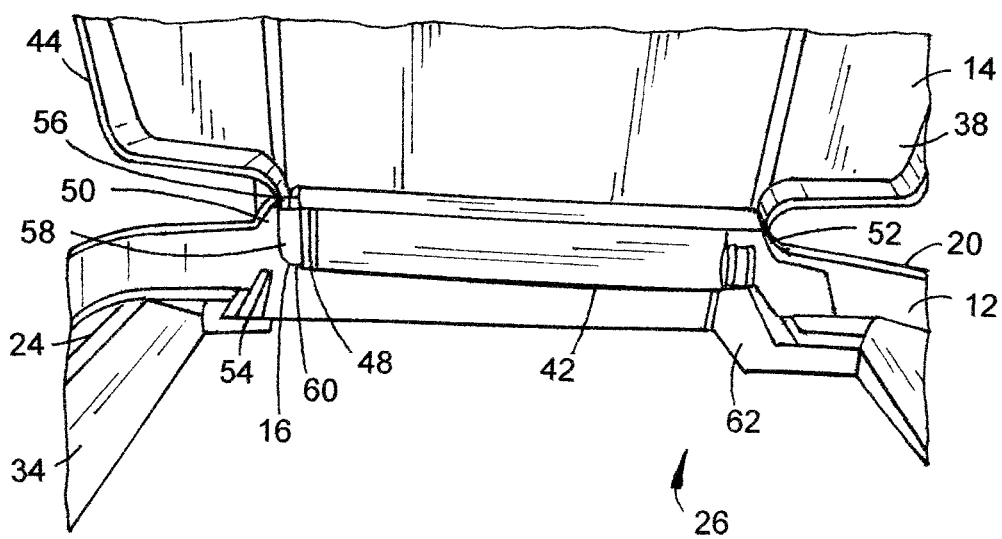
FIG. 5 is a partial, detailed view of the food tray cover hereof in an open position.

Referring now to FIGS. 3-5, the lid 14 further comprises means 48 for rotatably connecting the lid 14 to the frame 12. Preferably, the means 48 or connecting means 48 is at least one arm 50 fixedly secured to the lid 14 proximate the rear edge 42. The arm 50 extends through a portion of the frame 12. Preferably, the arm 50 extends or projects into or through the upper surface 20 or sidewall 28 of the frame 12. Thus, the arm 50 is free to rotate with respect to the frame 12, which allows the lid 14 to move between an open and a closed position over the opening 26 formed in the frame 12.

Preferably, and as shown, the lid 14 includes a pair of diametrically opposed arms 50, 52. Both arms 50, 52 are fixedly secured to the lid 14 or integrally formed therewith and extend through frame 12. By including a pair of arms 50, 52, additional stabilization of the lid 14 on the frame 12 is provided.

Preferably, the means 16 or biasing means 16 is a torsionally prestressed spring 54 having a first end 56, at least one medial winding 58, and a second end 60. Torsion springs are well known and commercially available springs that work by twisting the spring into a stressed position, thereby storing mechanical energy until the spring is free to rotate to its unstressed position.

The winding 58 of the spring 52 encircles at least a portion of the arm 50 and the first and second ends 56, 60 of the spring 52 extend outwardly from and substantially normal to the arm 50. The first end 56 of the spring 54 abuts against a portion of the lid 14 and the second end 60 of the spring 54 abuts against a portion of the frame 12. Preferably, the second end of the spring 54 abuts against the rear edge 42 of the lid 14.

In its assembled form, the spring 54 is prestressed such that when the lid 14 is released from the frame 12, as described below, the spring 54 automatically unwinds to its unstressed point. Thus, as the spring 54 unwinds and becomes unstressed, the first and the second ends 56, 60 of the spring 54 move in opposite directions in order to rotate the lid 14 upwardly and away from the frame 12. It is to be understood that the specific degree of opening and speed at which the lid 14 rotates away from the frame 12 is directly related to the amount of initial stressing on the spring 54 when the lid 14 is in the closed position.

As shown, preferably a pair of springs 54, 62 are utilized in order to provide a greater degree of rotation between the lid 14 and the frame 12.

It is to be understood that by increasing the diameter, length, and/or thickness of the spring 54, this will provide a stronger rotational force in lifting the lid 14 when released from the frame 12.

Where it is desired to further limit the speed at which the lid 14 opens, the connecting means 48 and/or the biasing means 16 may include a quantity of non-toxic damping grease to increase the amount of friction between the frame 12 and the lid 14 in order to slow the raising of the lid 14 as the spring unflexes to its relaxed state. Preferably, the damping grease is confined to location of the connecting means 48 and the biasing means 16 in order to prevent the damping grease from encroaching onto other components of the cover 10 or dripping into the food tray 100.

Figure 6:
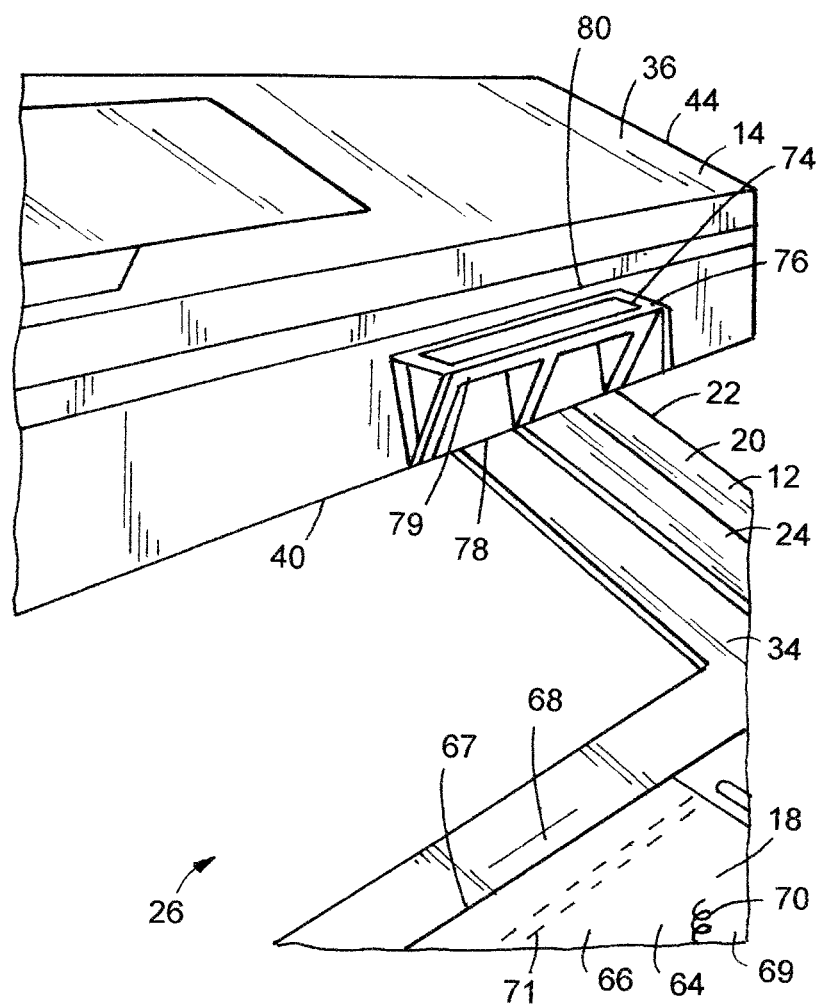
FIG. 6 is a partial, detailed view of a lid of the food tray cover hereof.

Referring now to FIGS. 4 and 6, as shown, the means 18 or releasable locking means 18 is a spring-loaded locking mechanism 64 disposed on the frame 12. The locking mechanism 64 comprises a trigger 66 which engages the lid 14 in order to secure the lid 14 in the closed position, as described below. The trigger 66 has a front end 67 and a rear end 69. A rod 71 extends longitudinally through the trigger 66, or alternatively may be secured below the trigger 66, in order to allow the trigger 66 to pivot with respect to the frame 12. A spring 70 is vertically disposed below the rear end 69 of the trigger 66, between the trigger 66 and the frame 12, which allows the front end 67 of the trigger 66 to pivot upwardly when the rear end 69 is pressed.

In order for the lid 14 to be removably secured to the frame 12, the lid 14 includes an angular protrusion 74, Preferably, the protrusion 74 extends outwardly from the forward edge 40 of the lid 14 or any other suitable portion of the lid 14 in order to mate with the releasable locking means 18 when the lid 14 is in the closed position. The protrusion 74 includes a top end 76 and a bottom end 78, More particularly, the top end 76 of the protrusion 74 extends outwardly from the lid 14 further than the bottom end 78 thereof to provide an angled front edge 79. The top end 76 defines a ledge 80 for retain the trigger 66.

When the lid 14 is in the closed position, the front end 67 of the trigger 66 extends above the ledge 80 of the protrusion 74 to prevent the lid 14 from rising. When the rear end 69 of the trigger 66 is pressed, the front end 67 of the trigger 66 pivots away from the protrusion 74 and the lid 14 is free to swing open.

Preferably, the locking mechanism 64 further includes a spring-loaded, retractable latch 68 extending outwardly from the front end 67 of the trigger 66 and into the opening 26. When fully extended, the latch 68 sits atop the ledge 80 of the protrusion 74 in order to secure the lid 14 in the closed position. When the lid 14 is being lowered, the angled front edge 79 of the protrusion causes the latch 68 to temporarily retract into the trigger 66 until the lid 14 is fully closed. Thereafter, the latch 68 automatically re-extends over the ledge 80 to secure the lid 14 in place.

It is to be understood that the cover 10 is not intended to be limited to the specifically described locking mechanism 64 described herein. Alternatively, the latch 68 or trigger 66, itself, may extend into the protrusion 74 to lock the lid 14 in place as opposed to extending above the ledge 80. It is to be understood that other well-known and commercially available locking devices for releasably locking the lid 14 to the frame 12 are available. Such devices include motion-activated sensors, remote-controlled components, and other suitable switches.

In use, and as described above, the food tray cover 10 allows a user to release the lid 14 from the frame 12 by applying manual pressure to the trigger 66, thereby unlocking the lid 14 from its closed and temporarily secured position. The at least one torsion spring 54 or the pair of torsion springs 54, 62 then unflexes, thus, rotating the lid 14 to a raised or open position.

Once the lid 14 is open, the user may use his or her free hand to remove food from the tray 100 through the opening 26 in the frame 12. Thereafter, the user applies downward pressure to the lid 14 in order to close the lid 14 over the frame 12. The latch 60 of the locking mechanism 64 then automatically retracts once it engages the angular protrusion 74, which pushes the latch 68 inwardly. Once the lid 14 is fully lowered, the latch 68 extends back over the top end 76 of the protrusion 74 and above the ledge 80 thereof in order to secure the lid 14 to the frame 12.

Although not shown in the drawing, it is to be understood that the biasing means 16 may comprise any number of commercially available torsion bars, torsion fibers, friction hinges, or the like, in lieu of the springs 54, 62. Specifically, a deformable plastic component may be disposed along the frame 12, which is compressed as the lid 14 is lowered and secured to the frame 12. Once the lid 14 is released, the plastic component is free to expand, thereby forcing the lid 14 to rise.

Referring now to FIGS. 7-11B there is depicted therein an alternate embodiment of the food tray cover hereof and, generally, denoted at 210. According to this embodiment the food tray cover, generally, comprises a frame 212 and a lid 214. The frame defines a perimetral base which facilitates removable seating of the cover on the upper perimetral edge of the food tray such as that shown in FIG. 2.

Figure 8:
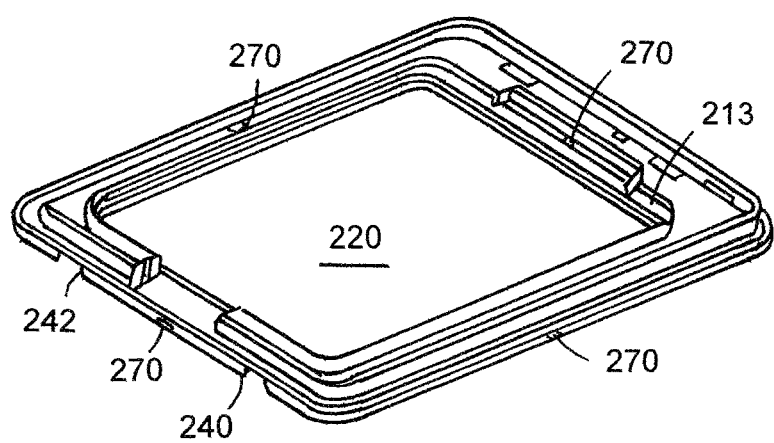
FIG. 8 is a perspective view of the bottom of the frame used in the second embodiment.

As with the first embodiment, the frame 212 comprises a ledge 216. The ledge has a first or rearward end 216A, a second or forward end 216B and sides 216C and 216D, The frame 212 also includes a central or medial step-up shoulder 218, with a shoulder inner edge 218A, which is complimentarily configured to the ledge 216, It should be noted that the cover is shown as being rectangular, which is the typical configuration for the food tray itself. Other configurations can be accommodated in order to conform to the geometry of the food or warming tray. As shown in FIG. 8, a perimetral interior recess wall 213 extends about the shoulder 218. The ledge 216 has a first or rearward end 216A, a second or forward end 216B and sides 216C and 216D.

The frame or base has a central cut-out portion 226.

The frame or base as a central cut-out portion 220.

A plurality of stops 228 are integrally formed with the ledge rearwardly of the end 214A of the lid and define means for limiting the rotation of the lid in cooperation with the biasing means.

The means for limiting rotation are disposed or formed at a first end 214A of the lid.

The opposed end of the ledge 216B has an embossment 230 which defines a retainer or keeper for temporarily holding the lid in position.

The lid is a substantially planar member having first and second ends 214A and 214B. However, it may be provided with some convex curvature to enable a steam to condense and move towards the edge of the lid.

The lid 214 is rotatably mounted within the cover 10 and seats in the recess wall 213. The lid 214 has a thickness such that when in the closed position, it is substantially flush with the upper surface of the shoulder 218.

Figure 9:
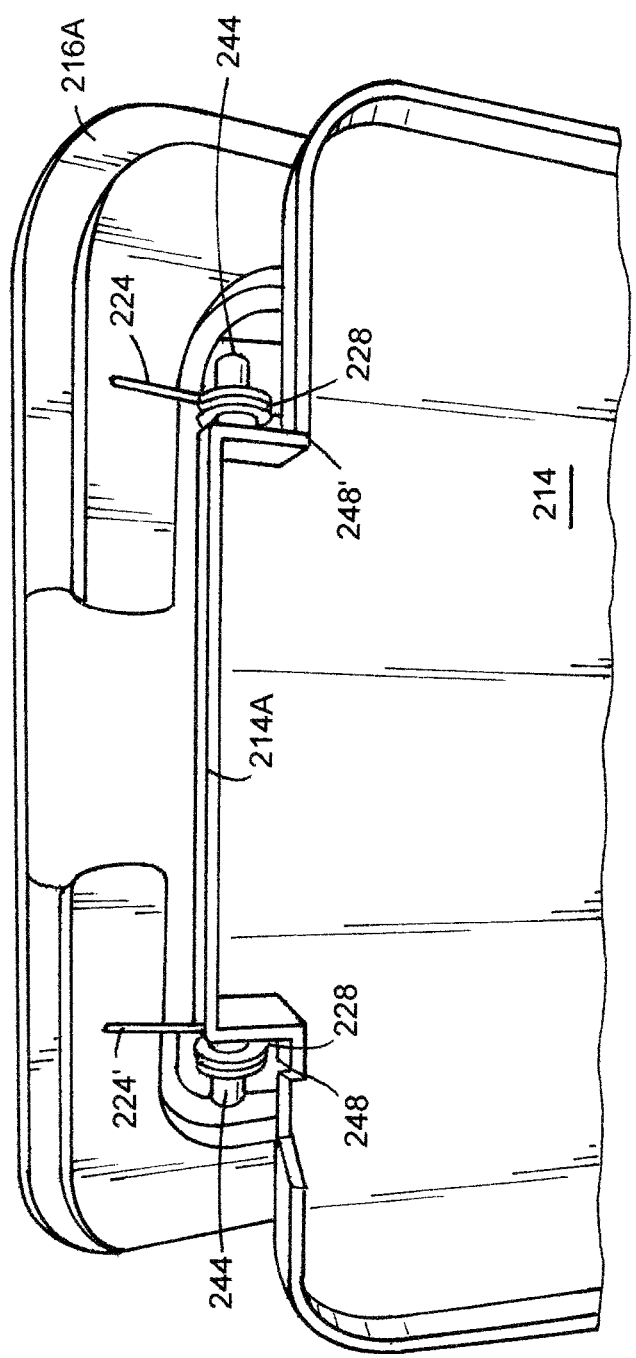
FIG. 9 is a partial plan view of the cover showing the biasing means.
Figure 10:
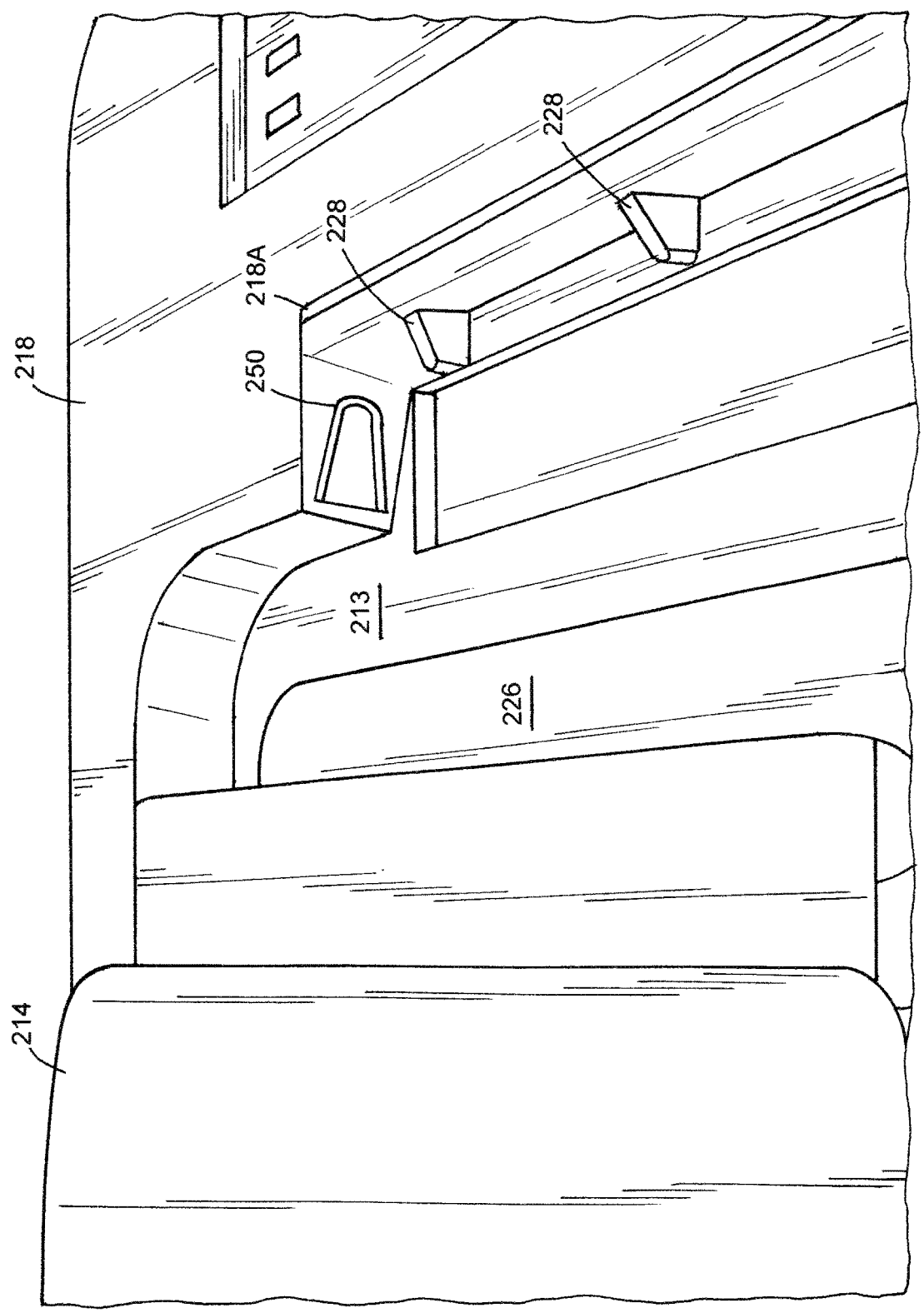
FIG. 10 is a partial perspective exploded view showing the fitting of the lid to the frame.

With more particularity and as shown in FIG. 9, the ledge has a pair of spaced apart slits 224, 224' which, as detailed hereinafter, define keepers for biasing means which normally urges the lid to an open position.

Figure 7:
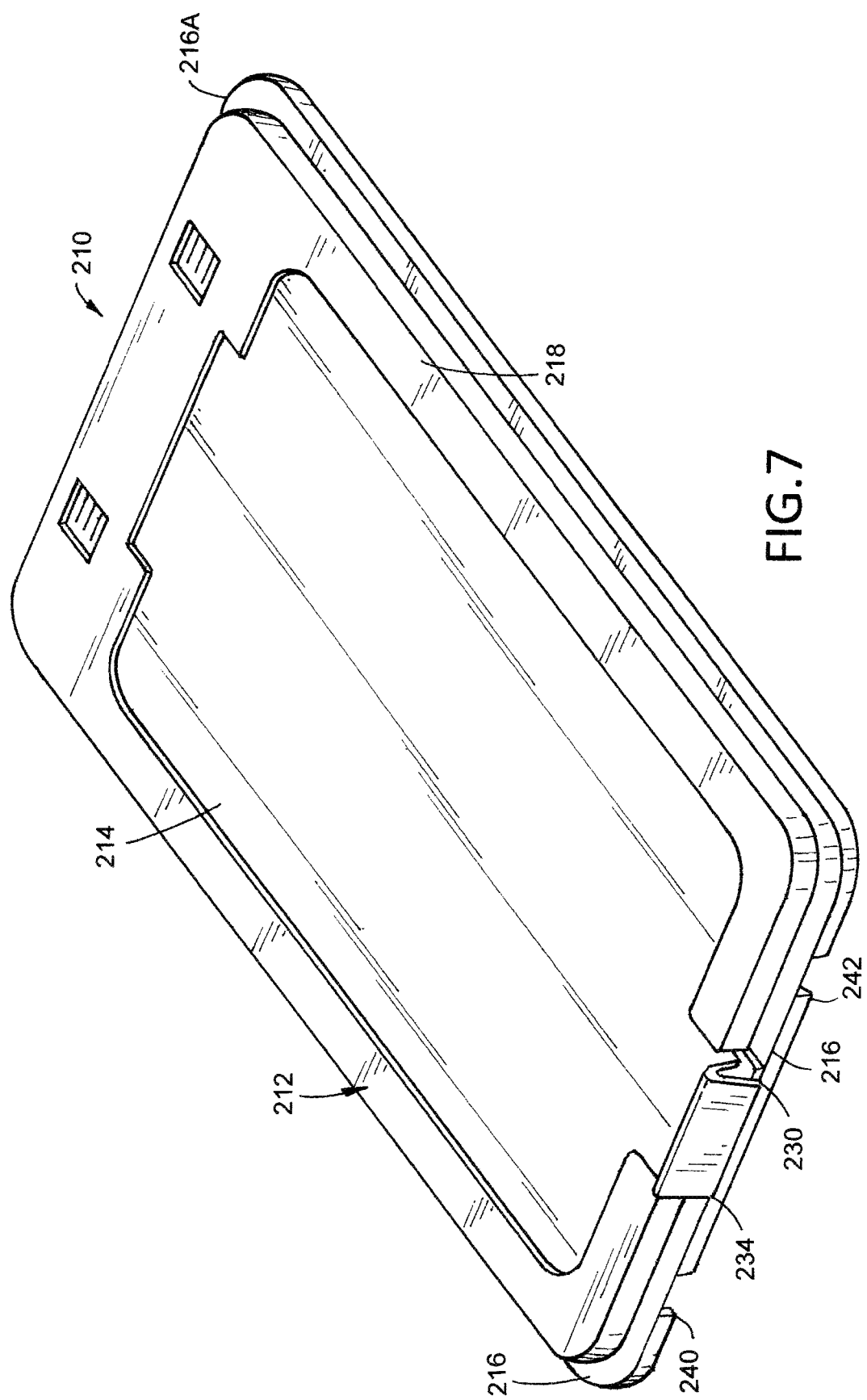
FIG. 7 is a perspective view of an alternate embodiment hereof.

As shown in FIG. 7 the end 214B of the lid has a catch 234. The catch 234 is substantially J-shaped and has a leg 236 which engages the retainer 230 provided on the shoulder 218 to releasably lock the lid in a closed position.

As shown in the drawing, each end 216A and 216B of the ledge has a pair of cutouts 240, 242 (only those at end 216B being shown) which removably seat the wire from the food tray.

In use, the lid is placed on the food tray and seated thereatop to maintain the heat of the food therewithin. As shown in FIG. 8 locking tabs 270 are provided around the perimeter of the ledge and are emplaced under the lip 104 (FIG. 1) of the food tray 100 to temporarily lock the cover in position. Because of the flexibility of plastic used to manufacture the cover, it can be fixed to place the tabs under the lip.

As shown in FIG. 9 a pair of opposed spindles 244, 244' project outwardly from the rearward end of the lid. The spindles are retained in opposed seats or cut outs (only one of which is shown at 250) formed in the shoulder 218.

The biasing means or springs 228, 228', respectively, are wound around the spindles. One end of each spring sits in an associated slit 224, 224' formed in the ledge and the opposite end is seated in an associated slot 248, 248' formed in the lid itself and is retained thereon.

Figure 11A:
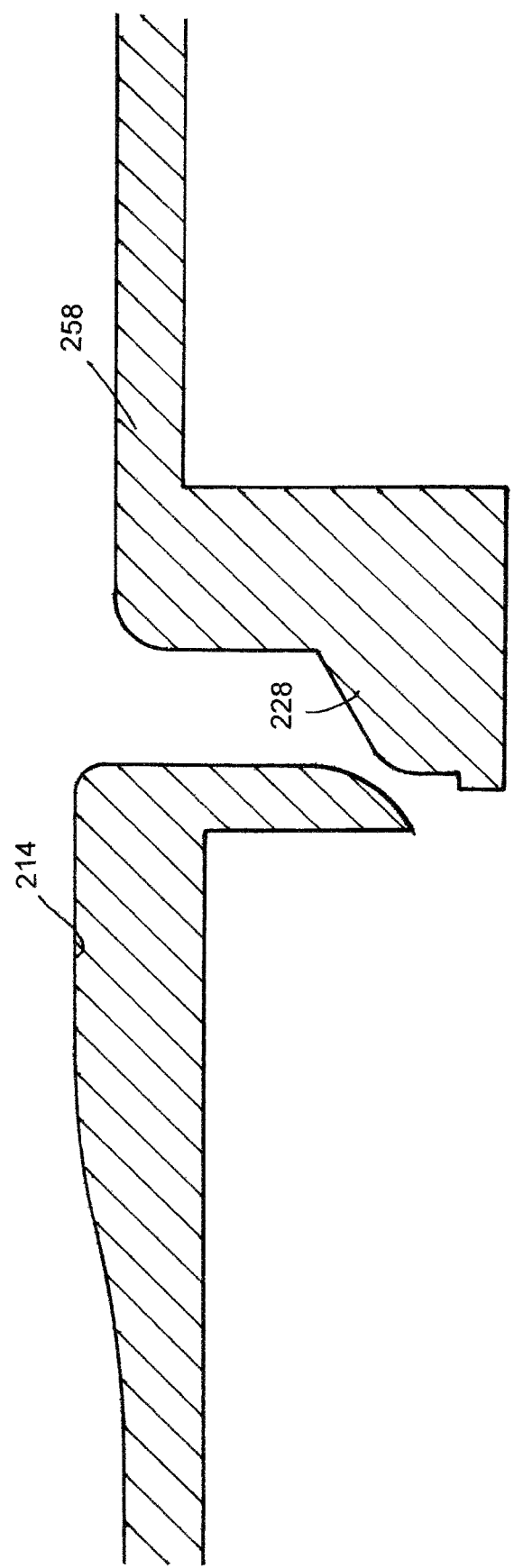
FIGS. 11A and 11B are schematic illustrations showing the open and closed position of the base in conjunction with the frame.
Figure 11B:
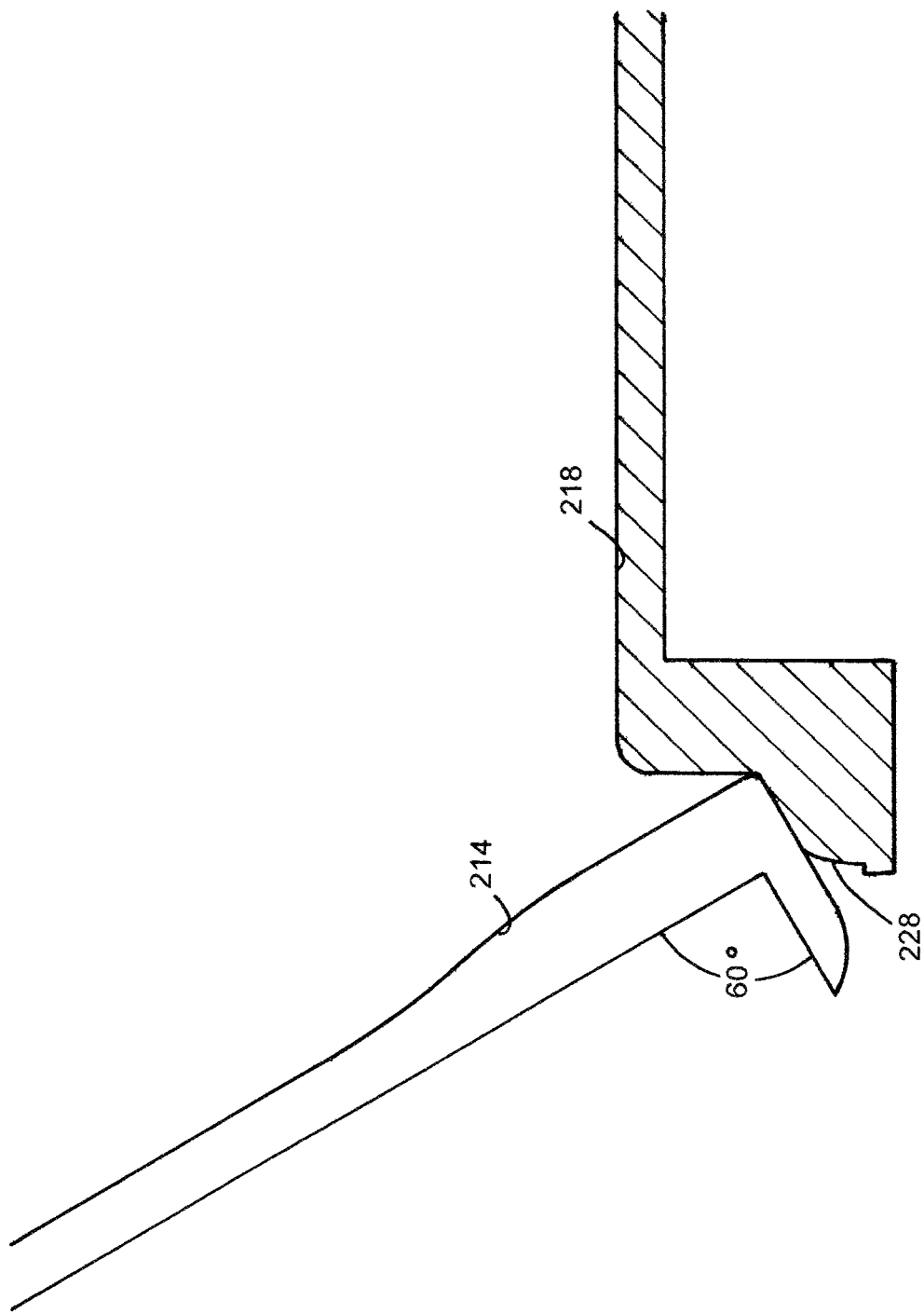

As shown in FIGS. 11 and 11B, when the lid is rotated due to the torsion of the springs, the lid rotates to an open position and is maintained in an open position by virtue of the stops associated therewith.

In fabricating the present lid, it is formed from a food safe flexible plastic, such as a polypropylene having sufficient flexibility to enable the lid to be releasably locked in place as described above.

The cover hereof is reusable and can be dimensioned to fit any food warming tray, chafing dish or the like.

To serve from the food tray the lid is opened and it remains thereat due to the bias of the springs.

From the above, it is to be appreciated that defined herein is a new and unique food tray cover that allows for a lid thereof to be opened and closed with minimal effort and maintain an open position until manually closed.

LIST OF REFERENCE NUMERALS

10 Food tray cover
12 Frame
14 Lid
16 Biasing means
18 Releasable locking means
20 Upper surface of frame 22 Outer edge of frame
24 Inner edge of frame
26 Opening in frame
28 Sidewall of frame
32 Cutout
34 Sealing gasket
35 Securing means
36 Top surface of lid
37 Hook on frame
38 Bottom surface of lid
40 Forward edge of lid
42 Rear edge of lid
44 Side edge of lid
46 Side edge of lid
48 Connecting means
50 Arm
52 Arm
54 Spring
56 First end of spring
58 Winding of spring
60 Second end of spring
62 Spring
64 Locking mechanism
66 Trigger
67 Front end of trigger
68 Latch
69 Rear end of trigger
70 Spring
71 Rod
74 Protrusion
76 Top end of protrusion
78 Bottom end of protrusion
79 Front edge of protrusion
80 Ledge
82 Utensil holder
84 Wall of holder
86 Wall of holder
88 Wall of holder
90 Wall of holder
92 Interior of holder
94 Open side of holder
100 Food tray
102 Wire Frame
104 Lip of food tray
106 Handles of wire frame
210 Food tray cover
212 Frame
214 Lid
214A End
216 Ledge
216B End
218 Shoulder
220 Cut-out portion
224 Slot
224' Slot
228 Stop
230 Retainer
232 Retainer
234 Leg
240 Openings
244 Opposed spindles
244' Opposed spindles
228 Biasing means or springs
228' Biasing means or springs
248 Associated slot
248' Associated slot
250 Spindle seat
252 Spindle seat
270 Locking tabs Having, thus, described the invention what is claimed is:

1. A cover for a food tray, the food tray of the type which is seated on a stand having a handle, comprising:
   (a) a frame, the frame dimensioned to seat atop a food tray, the frame including an upper surface having an outer edge and an inner edge, the outer edge having a shoulder defining a ledge, and the perimeter of the inner edge defining a central opening;
   (b) a single lid rotatably attached to the frame and seated in the opening, the lid being moveable between an open position and a closed position;
   (c) means for biasing the lid between the closed position and the open position; and
   (d) means for releasably locking the lid to the frame when in the closed position;
   (e) a heat sealing gasket disposed on the frame to seal the frame on the food tray and
   (f) a plurality of spatially spaced apart cut-outs formed in the side wall for seating the stand handle therein.

2. The cover of claim 1, wherein the cover has a holder for removably storing utensils associated therewith.

3. The cover of claim 1, which further comprises: means for limiting the rotation of the lid when in its open position, the lid having a forward edge and an opposed rear edge the inner edge of the frame defining at least one stop for limiting rotation of the rear edge of the lid.

4. The cover of claim 3, wherein the lid further comprises: a pair of opposed spindles, laterally projecting outwardly from the first end of the lid and integrally formed therewith, the means for biasing comprises a pair of springs, each one wound around an associated spindle, the lid and the frame cooperating to retain the springs in position.

5. The cover of claim 4 further comprising:
a pair of opposed seats formed in the rear edge proximate the forward edge of the lid, each seat receiving a free end of the associated spindle.

6. The cover of claim 1, wherein the frame has a central recess wall coplanar with the ledge and integral therewith, the recess wall defining the perimeter of the central opening, the lid being seated on the recess wall.

* * * * *